United States Patent
Kook et al.

(10) Patent No.: US 9,752,658 B2
(45) Date of Patent: Sep. 5, 2017

(54) TRANSMISSION FOR VEHICLES

(71) Applicant: Hyundai Motor Company, Seoul (KR)

(72) Inventors: Jae Chang Kook, Hwaseong-Si (KR); Seong Wook Hwang, Gunpo-Si (KR); Hyu Tae Shim, Hwaseong-Si (KR); Seong Wook Ji, Ansan-Si (KR); Won Min Cho, Hwaseong-Si (KR); Kang Soo Seo, Yongin-Si (KR); Myeong Hoon Noh, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/938,128

(22) Filed: Nov. 11, 2015

(65) Prior Publication Data
US 2017/0002901 A1 Jan. 5, 2017

(30) Foreign Application Priority Data
Jul. 1, 2015 (KR) .................. 10-2015-0094210

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| 7,993,235 B2 | 8/2011 | Wittkopp et al. |
| 8,038,566 B2 | 10/2011 | Phillips et al. |
| 8,574,113 B1 * | 11/2013 | Goleski ............ F16H 3/66 475/282 |
| 2011/0009229 A1 * | 1/2011 | Bauknecht ......... F16H 3/66 475/275 |
| 2016/0109006 A1 * | 4/2016 | Schoolcraft ....... F16H 15/52 475/185 |

FOREIGN PATENT DOCUMENTS

| DE | 102009028725 A1 * | 2/2011 | ........... F16H 3/66 |
| KR | 10-1090813 B1 | 12/2011 | |
| KR | 10-2013-0003981 A | 1/2013 | |

* cited by examiner

*Primary Examiner* — Erin D Bishop
(74) *Attorney, Agent, or Firm* — Morgan, Lewis & Bockius LLP

(57) ABSTRACT

A transmission for vehicles may include a first planetary gear set, a second planetary gear set, a third planetary gear set, and a fourth planetary gear set each including three rotary elements, and a plurality of friction members, in which the friction members are connected to at least one or more of the rotary elements of the planetary gear sets and control rotation of the rotary elements.

6 Claims, 2 Drawing Sheets

FIG. 2

| GEAR | C1 | B | C2 | C3 | C4 | C5 | GEAR RATIO |
|---|---|---|---|---|---|---|---|
| 1 |  |  | ● | ● |  | ● | 3.700 |
| 2 |  |  | ● | ● | ● |  | 2.551 |
| 3 |  |  |  | ● | ● | ● | 2.279 |
| 4 | ● |  |  | ● | ● |  | 1.525 |
| 5 | ● |  |  | ● |  | ● | 1.243 |
| 6 | ● |  | ● | ● |  |  | 1.000 |
| 7 | ● |  | ● |  | ● |  | 0.809 |
| 8 | ● |  | ● |  |  | ● | 0.667 |
| 9 | ● | ● | ● |  |  |  | 0.545 |
| 10 | ● | ● |  |  |  | ● | 0.469 |
| R1 |  | ● |  | ● |  | ● | 4.625 |

TRANSMISSION FOR VEHICLES

CROSS REFERENCE TO RELATED APPLICATION

The present application claims priority to Korean Patent Application No. 10-2015-0094210, filed Jul. 1, 2015, the entire contents of which is incorporated herein for all purposes by this reference.

BACKGROUND OF THE INVENTION

Field of the Invention

The present invention relates to a transmission for vehicles that can improve fuel efficiency by implementing multiple steps of shifting and improve vehicle driving comfort by using operating points in a low RPM range of an engine.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As for an automatic transmission, there are various methods of improving fuel efficiency, and operability and competitiveness in fuel efficiency can both be secured by implementing multiple steps or stages of shifting.

However, when the shift ranges increase, the number of parts in an automatic transmission also increases, so the automatic transmission may be difficult to mount, the manufacturing cost and weight may be increased, and power transmission efficiency may be deteriorated.

Accordingly, in order to increase the effect of improving fuel efficiency through multiple steps of shifting, it is important to develop a gear train structure that can achieve maximum efficiency with fewer parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for vehicles that can improve fuel efficiency by implementing multiple steps of shifting and improve vehicle driving comfort by using operating points in a low RPM range of an engine.

According to various aspects of the present invention, a transmission for vehicles may include a first planetary gear set, a second planetary gear set, a third planetary gear set, and a fourth planetary gear set each including three rotary elements, and a plurality of friction members, in which the first planetary gear set may include a first rotary element connected to an input shaft, a second rotary element operating as a selectively-fixed element, and a third rotary element connected with a second rotary element of the second planetary gear set and selectively connected with a third rotary element of the third planetary gear set, the second planetary gear set may include a first rotary element selectively connected with a second rotary element of the third planetary gear set and selectively connected with the third rotary element of the third planetary gear set, the second rotary element selectively connected with a third rotary element of the fourth planetary gear set, and a third rotary element operating as a fixed element, the third planetary gear set may include a first rotary element connected with a second rotary element of the fourth planetary gear set, and the second rotary element selectively connected to the input shaft, the fourth planetary gear set may include a first rotary element connected to the input shaft, and the second rotary element connected to an output shaft, and the friction members may be connected to at least one or more of the rotary elements of the planetary gear sets and control rotation of the rotary elements.

In the first planetary gear set, the first rotary element may be a first sun gear, the second rotary element may be a first carrier, and the third rotary element may be a first ring gear, in the second planetary gear set, the first rotary element may be a second sun gear, the second rotary element may be a second carrier, and the third rotary element may be a second ring gear, in the third planetary gear set, the first rotary element may be a third sun gear, the second rotary element may be a third carrier, and the third rotary element may be a third ring gear, and in the fourth planetary gear set, the first rotary element may be a fourth sun gear, the second rotary element may be a fourth carrier, and the third rotary element may be a fourth ring gear.

The second rotary element of the first planetary gear set may be selectively connected to and disconnected from a transmission case by a brake, and the third rotary element of the first planetary gear set and the third rotary element of the third planetary gear set may be selectively connected to and disconnected from each other by a second clutch.

The first rotary element of the second planetary gear set and the second rotary element of the third planetary gear set may be selectively connected to and disconnected from each other by a fourth clutch, the first rotary element of the second planetary gear set and the third rotary element of the third planetary gear set may be selectively connected to and disconnected from each other by a fifth clutch, the second rotary element of the second planetary gear set and the third rotary element of the fourth planetary gear set may be selectively connected to and disconnected from each other by a third clutch, and the third rotary element of the second planetary gear set may be connected to the transmission case.

The second rotary element of the third planetary gear set may be selectively connected to and disconnected from the input shaft by a first clutch.

The first planetary gear set, the second planetary gear set, the third planetary gear set, and the fourth planetary gear set may be sequentially arranged in an axial direction.

The friction members may include a first clutch disposed to selectively connect and disconnect the input shaft and the second rotary element of the third planetary gear set, a second clutch disposed to selectively connect and disconnect the third rotary element of the first planetary gear set and the third rotary element of the third planetary gear set, a third clutch disposed to selectively connect and disconnect the second rotary element of the second planetary gear set and the third rotary element of the fourth planetary gear set, a fourth clutch disposed to selectively connect and disconnect the first rotary element of the second planetary gear set and the second rotary element of the third planetary gear set, a fifth clutch disposed to selectively connect and disconnect the first rotary element of the second planetary gear set and the third rotary element of the third planetary gear set, and a brake disposed to selectively connect and disconnect the second rotary element of the first planetary gear set and a transmission case.

According to various aspects of the present invention, a transmission for vehicles may include a first planetary gear set, a second planetary gear set, a third planetary gear set, and a fourth planetary gear set each including three rotary elements, an input shaft connected to a first rotary element of the first planetary gear set, a first rotary element of the fourth planetary gear set, and a first clutch, a first shaft connecting a second rotary element of the first planetary gear set and a brake, a second shaft connecting a third rotary element of the first planetary gear set, a second rotary element of the second planetary gear set, a second clutch, and a third clutch, a third shaft connecting a first rotary element of the second planetary gear set, a fourth clutch, and a fifth clutch, a fourth shaft connecting a second rotary element of the third planetary gear set, the first clutch, and the fourth clutch, a fifth shaft connecting a third rotary element of the third planetary gear set, the second clutch, and the fifth clutch, a sixth shaft connecting the third rotary element of the fourth planetary gear set and the third clutch, an output shaft connecting the first rotary element of the third planetary gear set and the second rotary element of the fourth planetary gear set, and a transmission case connected with the third rotary element of the second planetary gear set and the brake.

The first clutch may be disposed for selectively connecting and disconnecting the input shaft and the fourth shaft, the second clutch may be disposed for selectively connecting and disconnecting the second shaft and the fifth shaft, the third clutch may be disposed for selectively connecting and disconnecting the second shaft and the sixth shaft, the fourth clutch may be disposed for selectively connecting and disconnecting the third shaft and the fourth shaft, the fifth clutch may be disposed for selectively connecting and disconnecting the third shaft and the fifth shaft, and the brake may be disposed for selectively connecting and disconnecting the first shaft and the transmission case.

The first clutch may be disposed for selectively connecting and disconnecting the input shaft and the second rotary element of the third planetary gear set, the second clutch may be disposed for selectively connecting and disconnecting the third rotary element of the first planetary gear set and the third rotary element of the third planetary gear set, the third clutch may be disposed for selectively connecting and disconnecting the second rotary element of the second planetary gear set and the third rotary element of the fourth planetary gear set, the fourth clutch may be disposed for selectively connecting and disconnecting the first rotary element of the second planetary gear set and the second rotary element of the third planetary gear set, the fifth clutch may be disposed for selectively connecting and disconnecting the first rotary element of the second planetary gear set and the third rotary element of the third planetary gear set, and the brake may be disposed for selectively connecting and disconnecting the second rotary element of the first planetary gear set and the transmission case.

According to various aspects of the present invention, a transmission for vehicles may include a first planetary gear set including a first rotary element operating as a constant input element by being connected to an input shaft, a second rotary element operated a selectively-fixed element by a friction member, and a third rotary element operating as a selective output element, and a composite planetary gear set formed by connecting rotary elements of a second planetary gear set, a third planetary gear set, and a fourth planetary gear set, in which the composite planetary gear set may include a plurality of composite rotary elements formed by connecting two or more rotary elements between the rotary elements of the second, third, and fourth planetary gear set, directly or through friction members, the plurality of composite rotary elements may include a first composite rotary element connected to the input shaft by a friction member, a second composite rotary element in which the third rotary element of the first planetary gear set may be connected to a rotary element of at least one of the second, third, and fourth planetary gear set, directly or through a friction member, and the rotary elements of the second, third, and fourth planetary gear sets may be connected through friction members, a third composite rotary element operating as a constant fixed element, a fourth composite rotary element operating as a constant input element by being connected to the input shaft, and a fifth composite rotary element operating as a constant output element by being connected to an output shaft.

In the first planetary gear set, the first rotary element may be a first sun gear, a second rotary element may be a first carrier, and the third rotary element may be a first ring gear, and the first carrier may be selectively connected to and disconnected from a transmission case.

The first composite rotary element may include a second sun gear of the second planetary gear set and a third carrier of the third planetary gear set, the third carrier and the input shaft may be selectively connected to and disconnected from each other by a first clutch, and the third carrier and the second sun gear may be selectively connected to and disconnected from each other by a fourth clutch.

The second composite rotary element may include a second carrier of the second planetary gear set, a third ring gear of the third planetary gear set, and a fourth ring gear of the fourth planetary gear set, the second carrier and the third ring gear may be selectively connected to and disconnected from each other by a second clutch, the second carrier and the fourth ring gear may be selectively connected to and disconnected from each other by a third clutch, the third ring gear and the first ring gear of the first planetary gear set may be selectively connected to and disconnected from each other by the second clutch, and the third ring gear and the second sun gear of the second planetary gear set may be selectively connected to and disconnected from each other by a fifth clutch.

The third composite rotary element may be a second ring gear of the second planetary gear set and connected to the transmission case, the fourth composite rotary element may be a fourth sun gear of the fourth planetary gear set, and the fifth composite rotary element may include a third sun gear of the third planetary gear set and a fourth carrier of the fourth planetary gear set.

As described above, since the rotary elements of the first, second, third, and fourth planetary gear sets are selectively connected/disconnected by a plurality of clutches and a brake, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation in each range by the exemplary transmission for vehicles according to the present invention.

Figure 1:
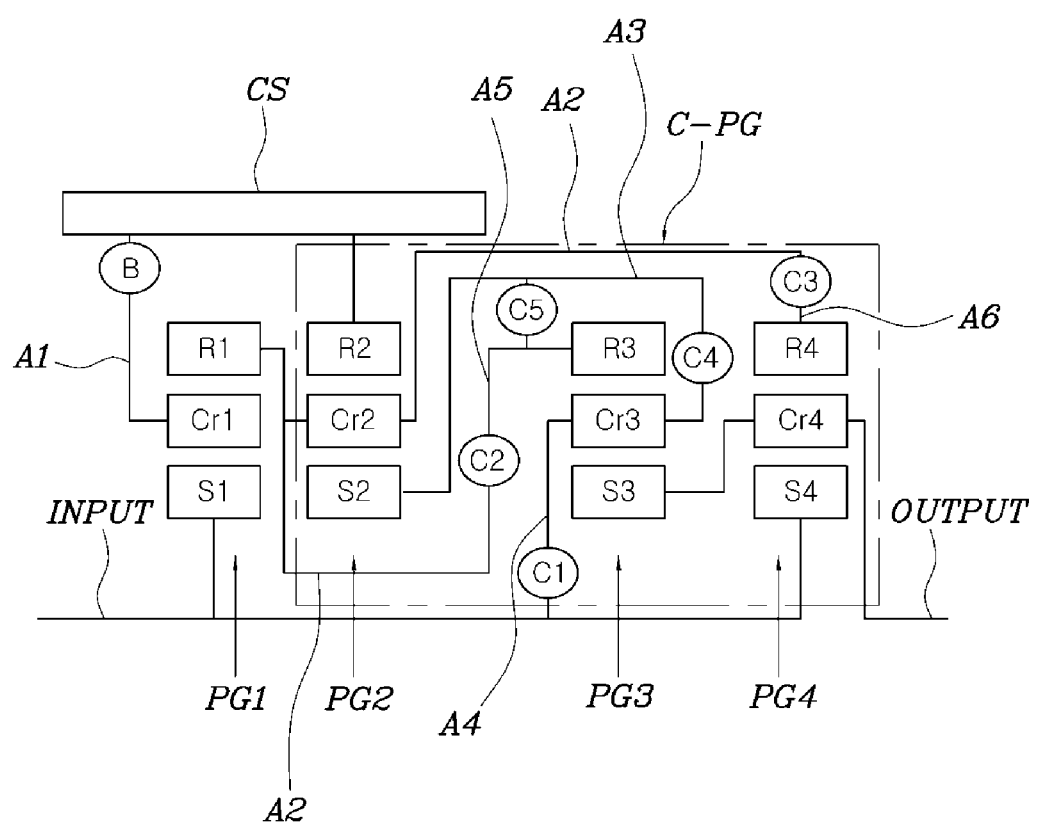
FIG. 1 is a diagram schematically showing the structure of an exemplary transmission for vehicles according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for vehicles according to various embodiments of the present invention largely includes a first planetary gear set PG1, a second planetary gear set PG2, a third planetary gear set PG3, and a fourth planetary gear set PG4, and the planetary gear sets each may include three rotary elements, that is, first, second, and third rotary elements.

Referring to FIG. 1, the first rotary element of the first planetary gear set PG1 may be connected to an input shaft INPUT. For example, the first rotary element of the first planetary gear set PG1 may be a first sun gear S1 and the first sun gear S1 may operate as a constant input element by being directly connected to the input shaft INPUT.

The second rotary element of the first planetary gear set PG1 may operate as a selectively-fixed element. For example, the second rotary element of the first planetary gear set PG1 may be a first carrier Cr1 and the first carrier Cr1 can be connected/disconnected to/from a transmission case C5 by a friction member.

The third rotary element of the first planetary gear set PG1 may be selectively connected with the second rotary element of the second planetary gear set PG2. For example, the third rotary element of the first planetary gear set PG1 may be a first ring gear R1 and the second rotary element of the second planetary gear set PG2 may be a second carrier Cr2, so the first ring gear R1 and the second carrier Cr2 can be directly connected to each other.

The third rotary element of the first planetary gear set PG1 and the third rotary element of the third planetary gear set PG3 may be selectively connected. For example, the third rotary element of the third planetary gear set PG3 may be a third ring gear R3, and the first ring gear R1 and the third ring gear R3 can be connected/disconnected to/from each other by a friction member.

The first rotary element of the second planetary gear set PG2 may be selectively connected with the second rotary element of the third planetary gear set PG3. For example, the first rotary element of the second planetary gear set PG2 may be a second sun gear S2 and the second rotary element of the third planetary gear set PG3 may be a third carrier Cr3, so the second sun gear S2 and the third carrier Cr3 can be connected/disconnected to/from each other by a friction member.

The first rotary element of the second planetary gear set PG2 may be selectively connected with the third rotary element of the third planetary gear set PG3. For example, the third rotary element of the third planetary gear set PG3 may be a third ring gear R3, and the second sun gear and the third ring gear R3 can be connected/disconnected to/from each other by a friction member.

The second rotary element of the second planetary gear set PG2 may be selectively connected with the third rotary element of the fourth planetary gear set PG4. For example, the second rotary element of the second planetary gear set PG2 may be a second carrier Cr2 and the third rotary element of the fourth planetary gear set PG4 may be a fourth ring gear R4, so the second carrier Cr2 and the fourth ring gear R4 can be connected/disconnected to/from each other by a friction member.

The third rotary element of the second planetary gear set PG2 may operate as a fixed element. For example, the third rotary element of the second planetary gear set PG2 may be a second ring gear R2 and the second ring gear R2 may operate as a constant fixed element by being directly connected to the transmission case C5.

The first rotary element of the third planetary gear set PG3 may be connected with the second rotary element of the fourth planetary gear set PG4. For example, the first rotary element of the third planetary gear set PG3 may be a third sun gear S3 and the second rotary element of the fourth planetary gear set PG4 may be a fourth carrier Cr4, so the third sun gear S3 and the fourth carrier Cr4 can be directly connected to each other.

The second rotary element of the third planetary gear set PG3 may be selectively connected to the input shaft INPUT. For example, the second rotary element of the third planetary gear set PG3 may be a third carrier Cr2, and the third carrier Cr2 and the output shaft OUTPUT can be connected/disconnected to/from each other by a friction member.

The first rotary element of the fourth planetary gear set PG4 may be connected to an input shaft INPUT. For example, the first rotary element of the fourth planetary gear set PG4 may be a fourth sun gear S4 and the fourth sun gear S4 may operate as a constant input element by being directly connected to the input shaft INPUT.

The second rotary element of the fourth planetary gear set PG4 may be connected to the output shaft OUTPUT. For example, the second rotary element of the fourth planetary gear set PG4 may be a fourth carrier Cr4 and the fourth carrier Cr4 may operate as a constant output element by being directly connected to the output shaft OUTPUT.

In the present invention, the first planetary gear set PG1, second planetary gear set PG2, third planetary gear set PG3, and fourth planetary gear set PG4 may be sequentially arranged in the axial direction of the input shaft INPUT and the output shaft OUTPUT. Further, all of the first planetary gear set PG1, second planetary gear set PG2, third planetary gear set PG3, and fourth planetary gear set PG4 may be single pinion planetary gear sets.

The present invention may further include a plurality of friction members connected to at least one or more of the rotary elements of the planetary gear sets and controlling rotation of the rotary elements. The friction members may be first, second, third, fourth, and fifth clutches C1, C2, C3, C4, and C5, and a brake B.

In detail, the first clutch C1 may be disposed for connecting/disconnecting the input shaft INPUT and the third carrier Cr3 that is the second rotary element of the third planetary gear set PG3.

The second clutch C2 may be disposed for connecting/disconnecting the first ring gear R1 that is the third rotary element of the first planetary gear set PG1 and the third ring gear that is the third rotary element of the third planetary gear set PG3.

The third clutch C3 may be disposed for connecting/disconnecting the second ring carrier Cr2 that is the second rotary element of the second planetary gear set PG2 and the fourth ring gear R4 that is the third rotary element of the fourth planetary gear set PG4.

The fourth clutch C4 may be disposed for connecting/disconnecting the second sun gear S2 that is the first rotary element of the second planetary gear set PG2 and the third carrier Cr3 that is the second rotary element of the third planetary gear set PG3.

The fifth clutch C5 may be disposed for connecting/disconnecting the second sun gear S2 that is the first rotary element of the second planetary gear set PG2 and the third ring gear R3 that is the third rotary element of the third planetary gear set PG3.

The brake B may be disposed for connecting/disconnecting the first carrier Cr1, which is the second rotary element of the first planetary gear set PG1, and the transmission case C5.

On the other hand, the rotary elements of the planetary gear sets may be connected through the input shaft INPUT, a first shaft A1 to a sixth shaft A6, and the output shaft OUTPUT.

Referring to FIG. 1, the first rotary element of the first planetary gear set PG1 and the first rotary element of the fourth planetary gear set PG4 may be directly connected to the input shaft INPUT, and a first side of the first clutch C1 may be connected to the input shaft INPUT.

The second rotary element of the first planetary gear set PG1 and a first side of the brake B may be connected to the first shaft A1.

The third rotary element of the first planetary gear set PG1, the second rotary element of the second planetary gear set PG2, a first side of the second clutch C2, and a first side of the third clutch C3 may be connected to the second shaft A2.

The first rotary element of the second planetary gear set PG2, a first side of the fourth clutch C4, and a first side of the fifth clutch C5 may be connected to the third shaft A3.

The second rotary element of the third planetary gear set PG3, a second side of the first clutch C1, and a second side of the fourth clutch C4 may be connected to the fourth shaft C4.

The third rotary element of the third planetary gear set PG3, a second side of the second clutch C2, and a second side of the fifth clutch C5 may be connected to the fifth shaft A5.

The third rotary element of the fourth planetary gear set PG3 and a second side of the third clutch C3 may be connected to the sixth shaft A6.

The first rotary element of the third planetary gear set PG3 and the second rotary element of the fourth planetary gear set PG4 may be directly connected to the output shaft OUTPUT.

The third rotary element of the second planetary gear set PG2 and a second side of the brake B may be connected to the transmission case C5.

For example, the first clutch C1 may be disposed for connecting/disconnecting the input shaft INPUT and the fourth shaft A4, the second clutch C2 may be disposed for connecting/disconnecting the second shaft A2 and the fifth shaft A5, and the third clutch C3 may be disposed for connecting/disconnecting the second shaft A2 and the sixth shaft A6.

Further, the fourth clutch C4 may be disposed for connecting/disconnecting the third shaft A3 and the fourth shaft A4, the fifth clutch C5 may be disposed for connecting/disconnecting the third shaft A3 the fifth shaft A5, and the brake B may be disposed for connecting/disconnecting the first shaft A1 and the transmission case C5.

On the other hand, the transmission for vehicles of the present invention may include the first planetary gear set PG1 and a composite planetary gear set C-PG composed of the second planetary gear set PG2, third planetary gear set PG3, and fourth planetary gear set PG4.

Referring to FIG. 1, in detail, the first planetary gear set PG1 includes first, second, and third rotary element, in which the first rotary element may operate as a constant input element by being connected to the input shaft INPUT. The first rotary element may be the first sun gear S1.

The second rotary element, which operates as a selectively-fixed element by a friction member, may be the first carrier Cr1. The friction member operating the second rotary element as a selectively-fixed element may be the brake B connected to the transmission case C5.

The third rotary element, which operates as a selective output element, may be the first ring gear R1.

The composite planetary gear set C-PG is formed by connecting the rotary elements of the second planetary gear set PG2, third planetary gear set PG3, and fourth planetary gear set PG4, and a plurality of rotary elements, that is, first, second, third, fourth, and fifth composite rotary elements may be configured by connecting two or more rotary element between the rotary elements of the second, third, and fourth planetary gear sets, directly or through a friction member.

The first composite rotary element, which is connected to the input shaft INPUT through a friction member and operates as a selective input element or a selective output element, may include the second sun gear S2 of the second planetary gear set and the third carrier Cr3 of the third planetary gear set PG3.

For example, the first clutch C1 is disposed as a friction member for connecting/disconnecting the third carrier Cr3 and the input shaft INPUT and third carrier Cr3 may operate as a selective input element.

The fourth clutch C4 may be disposed as a friction member for connecting/disconnecting the third carrier Cr3 and the second sun gear S2 and may selectively connect the third carrier Cr3 and the second sun gear S2.

That is, the first clutch C1 may be disposed for connecting the input shaft INPUT and the third carrier Cr3 and the fourth clutch C4 may be disposed for connecting/disconnecting the third carrier Cr3 and the second sun gear S2.

Further, in the second composite rotary element, the third rotary element of the first planetary gear set PG1 may operate as a selective input element or output element by being connected to the rotary elements of any one of the second, third, and fourth planetary gear sets, directly or through a friction member, and the rotary elements of one of the second, third, and fourth planetary gear sets may operate as selective output elements by being connected through a friction member.

The second composite rotary element may include the second carrier Cr2 of the second planetary gear set PG2, the third ring gear R3 of the third planetary gear set PG3, and the fourth ring gear R4 of the fourth planetary gear set PG4.

For example, the second clutch C2 may be disposed as a friction member for connecting/disconnecting the second carrier Cr2 and the third ring gear R3 and may selectively connect the second carrier Cr2 and the third ring gear R3.

The second carrier Cr2 and the first ring gear R1 are directly connected, so the first ring gear R1 and the third ring gear R3 are also connected/disconnected by the second clutch C2.

The third clutch C3 may be disposed as a friction member for connecting/disconnecting the second carrier Cr2 and the fourth ring gear R4 and may selectively connect the second carrier Cr2 and the fourth ring gear R4.

The fifth clutch C5 may be disposed as a friction member for connecting/disconnecting the third ring gear R3 and the second sun gear S2 and may selectively connect the third ring gear R3 and the second sun gear S2.

That is, the second clutch C2 may be disposed for connecting/disconnecting the second carrier Cr2, the first ring gear R1, and the third ring gear R3, the third clutch C3 may be disposed for connecting the second carrier Cr2 and the fourth ring gear R4, and the fifth clutch C5 may be disposed for connecting the third ring gear R3 and the second sun gear S2.

The third composite rotary element, which may operate as a constant fixed element, may be the second ring gear R2 of the second planetary gear set PG2.

For example, the second ring gear R2 may be fixed to the inner side of the transmission case C5.

The fourth composite rotary element, which may operate as a constant input element by being connected to the input shaft INPUT, may be the fourth sun gear S4 of the fourth planetary gear set PG4.

For example, the fourth sun gear S4 may be directly connected to the input shaft INPUT.

The fifth composite rotary element, which may operate as a constant output element by being connected to the output shaft OUTPUT, may include the third sun gear S3 of the third planetary gear set PG3 and the fourth carrier Cr4 of the fourth planetary gear set PG4.

For example, the fourth carrier Cr4 may be directly connected to the output shaft OUTPUT and the third sun gear S3 may be directly connected to the fourth carrier Cr4.

FIG. 2 is a table showing operation in each range by a transmission for vehicles according to various embodiments of the present invention, in which, for example, in order to implement a 1-range gear ratio, the second clutch C2, third clutch C3, and fifth clutch C5 may be connected and all other friction members may be disconnected.

In order to implement a 2-range gear ratio, the second clutch C2, third clutch C3, and fourth clutch C4 may be connected and all other friction members may be disconnected. Further, as for the other ranges, a vehicle can be driven with the gear ratios corresponding to the ranges by connecting/disconnecting, as shown in the table.

As described above, since the rotary elements of the first, second, third, and fourth planetary gear sets are selectively connected/disconnected by a five clutches and one brake B, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for vehicles, comprising:
 a first planetary gear set, a second planetary gear set, a third planetary gear set, and a fourth planetary gear set; and
 a plurality of friction members, wherein the plurality of friction members include a brake, a first clutch, a second clutch, a third clutch, a fourth clutch and a fifth clutch,
 wherein the first planetary gear set includes:
  a first rotary element connected to an input shaft;
  a second rotary element operating as a selectively-fixed element; and
  a third rotary element continuously connected with a second rotary element of the second planetary gear set and selectively connected with a third rotary element of the third planetary gear set,
 wherein the second planetary gear set includes:
  a first rotary element selectively connected with a second rotary element of the third planetary gear set and selectively connected with the third rotary element of the third planetary gear set;
  the second rotary element of the second planetary gear set, wherein the second rotary element of the second planetary gear set is selectively connected with a third rotary element of the fourth planetary gear set; and
  a third rotary element operating as a fixed element,
 wherein the third planetary gear set includes:
  a first rotary element continuously connected with a second rotary element of the fourth planetary gear set; and
  the second rotary element of the third planetary gear set, wherein the second rotary element of the third planetary gear set is selectively connected to the input shaft, wherein the fourth planetary gear set includes:
a first rotary element connected to the input shaft; and
the second rotary element of the fourth planetary gear set, wherein the second rotary element of the fourth planetary gear set is connected to an output shaft,
wherein each of the friction members is connected to at least one or more of the rotary elements of the planetary gear sets and controls rotation of the rotary elements,
wherein the first rotary element of the first planetary gear set is a first sun gear, the second rotary element of the first planetary gear set is a first carrier, and the third rotary element of the first planetary gear set is a first ring gear,
wherein the first rotary element of the second planetary gear set is a second sun gear, the second rotary element of the second planetary gear set is a second carrier, and the third rotary element of the second planetary gear set is a second ring gear,
wherein the first rotary element of the third planetary gear set is a third sun gear, the second rotary element of the third planetary gear set is a third carrier, and the third rotary element of the third planetary gear set is a third ring gear, and
wherein the first rotary element of the fourth planetary gear set is a fourth sun gear, the second rotary element of the fourth planetary gear set is a fourth carrier, and the third rotary element of the fourth planetary gear set is a fourth ring gear.

2. The transmission of claim 1, wherein the second rotary element of the first planetary gear set is selectively connected to and disconnected from a transmission case by the brake, and
the third rotary element of the first planetary gear set and the third rotary element of the third planetary gear set are selectively connected to and disconnected from each other by the second clutch.

3. The transmission of claim 1, wherein the first rotary element of the second planetary gear set and the second rotary element of the third planetary gear set are selectively connected to and disconnected from each other by the fourth clutch,
the first rotary element of the second planetary gear set and the third rotary element of the third planetary gear set are selectively connected to and disconnected from each other by the fifth clutch,
the second rotary element of the second planetary gear set and the third rotary element of the fourth planetary gear set are selectively connected to and disconnected from each other by the third clutch, and
the third rotary element of the second planetary gear set is connected to a transmission case.

4. The transmission of claim 1, wherein the second rotary element of the third planetary gear set is selectively connected to and disconnected from the input shaft by the first clutch.

5. The transmission of claim 1, wherein the first planetary gear set, the second planetary gear set, the third planetary gear set, and the fourth planetary gear set are sequentially arranged in an axial direction.

6. The transmission of claim 1, wherein the friction members include:
the first clutch disposed to selectively connect and disconnect the input shaft and the second rotary element of the third planetary gear set;
the second clutch disposed to selectively connect and disconnect the third rotary element of the first planetary gear set and the third rotary element of the third planetary gear set;
the third clutch disposed to selectively connect and disconnect the second rotary element of the second planetary gear set and the third rotary element of the fourth planetary gear set;
the fourth clutch disposed to selectively connect and disconnect the first rotary element of the second planetary gear set and the second rotary element of the third planetary gear set;
the fifth clutch disposed to selectively connect and disconnect the first rotary element of the second planetary gear set and the third rotary element of the third planetary gear set; and
the brake disposed to selectively connect and disconnect the second rotary element of the first planetary gear set and a transmission case.

* * * * *